Figure 1:
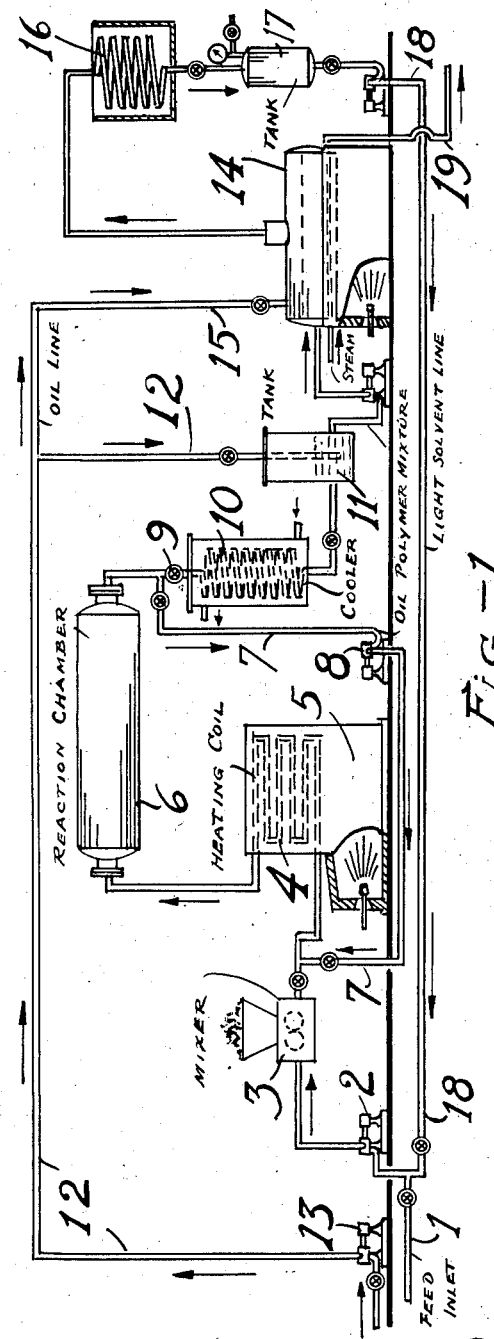

April 22, 1941.  P. K. FROLICH ET AL  2,239,501
LUBRICANTS CONTAINING POLYMERS OF INTERMEDIATE WEIGHT
Filed Dec. 12, 1933

Per K. Frolich
Floyd L. Miller  Inventors
P. L. Young  Attorney

Patented Apr. 22, 1941

2,239,501

UNITED STATES PATENT OFFICE 2,239,501

LUBRICANTS CONTAINING POLYMERS OF INTERMEDIATE WEIGHT

Per K. Frolich, Roselle, and Floyd L. Miller, Roselle Park, N. J., assignors to Standard Oil Development Company, a corporation of Delaware Application December 12, 1933, Serial No. 701,950

21 Claims. (Cl. 252—59)

The present invention relates to lubricating oils and more particularly to oils of high quality with increased stability, as well as their methods of preparation, and also to a stabilized thickening polymer which is used in the preparation of the lubricating oils. The invention will be fully understood from the following description and the drawing which illustrate methods for producing the polymer in the lubricating oils.

Figure 2:
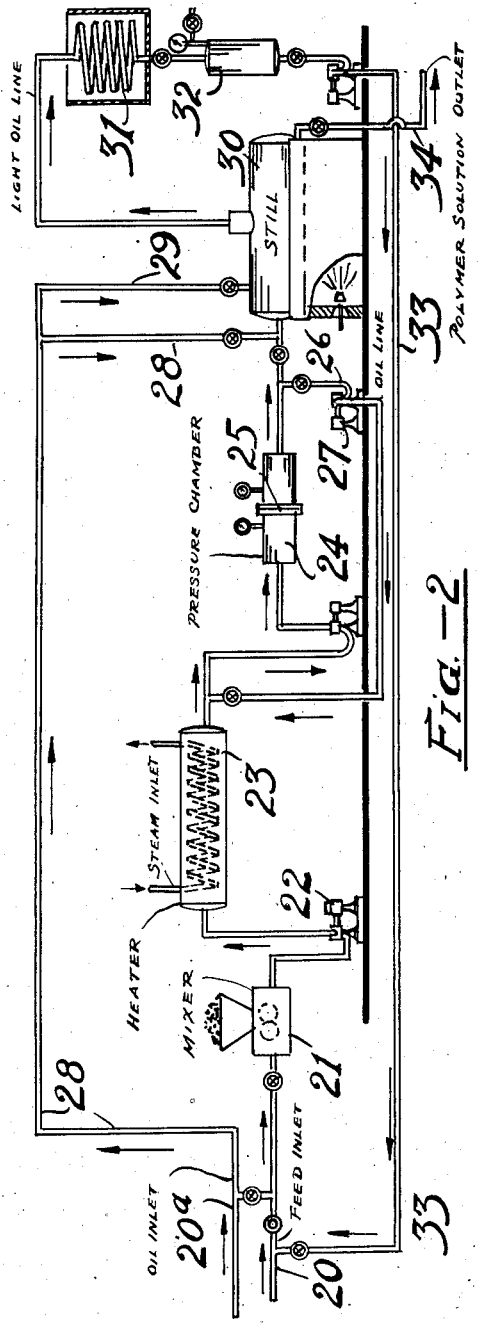

In the drawing:

Fig. 1 shows in diagrammatic form an apparatus adapted to accomplish the homogenization or stabilization of the polymer by means of a heat treatment, and Fig. 2 discloses a mechanical means for accomplishing the homogenization without the aid of the heat.

The present invention relates to the production of improved polymers which are mainly used in preparing lubricating oils of high quality. These polymers are of a type which will be defined as the non-asphaltic chain variety and they may be either synthetic or modified natural polymers, both of which are now known in the art.

As examples of the synthetic polymers, those produced by the polymerization of olefines at low temperatures, say below 0° F. or even much lower, for example —20 to —60° F., may be cited, especially the isobutylene polymers prepared by reaction in liquid phase using as a catalyst boron fluoride, titanium chloride, aluminum chloride, or their equivalents. Other catalysts may also be used, such as natural earths of the type of fuller's earth, bauxite, natural and artificial clays, active carbon and similar well-known polymerizing agents.

Besides isobutylene polymers, similar materials may be prepared from other olefins, particularly the alpha olefins such as isoamylene, styrol and indene. It should be repeated that all of these polymers are of the chain type and are non-asphaltic, by which it is intended to convey the fact that polymerization or other reaction is accomplished without a gradual loss of hydrogen and ring formation, the finished polymers containing exactly the same ratio of hydrogen to carbon as the polymerizing unit, for example isobutylene. These materials are essentially aliphatic in their polymerization and their nature and rings are not formed during the reaction, although they may have been present in the polymerizing unit, for example in the case of styrol. The polymers containing rings are preferably hydrogenated or alkylated to further increase their stability.

Another class of synthetic polymer is produced by the condensation of dichlor hydrocarbons, especially those containing less than five carbon atoms, with single ring aromatic hydrocarbons such as benzol or cresol. As a specific example of this type of polymer may be cited the reaction product obtained by the condensation of equimolal quantities of benzol and ethylene dichloride using aluminum chloride or its equivalent as the catalyst at ordinary or at low temperatures.

Of the natural or modified natural polymers, hydrogenated rubber may be cited as the typical example. These polymers are ordinarily heavier than most of those prepared by synthetic means but in their properties they are quite similar to the synthetic types mentioned above. Hydrogenation is carried out at room temperature or at higher temperatures, preferably under increased pressures. Hydrogenated materials of the nature of rubber may also be used, such as gutta percha, Guayule, balata and the like.

It should be repeated that all of the above materials, including both synthetic and modified natural polymers form a class of materials which are of great use in the thickening of lubricating oils and for other purposes, but they are sharply distinguished from other types of polymers, for example of the asphaltic type, by the fact that the addition of relatively small quantities brings about a very favorable change in the viscosity temperature curve of the lubricating oils, or, in other words, polymers of this particular class increase viscosity index as defined by Dean and Davis, Chem. & Met. Eng. 36, 618, (1929).

In this manner, oil with viscosity indices of 0, 30, 50 or whatnot may be raised to 100 or 110 or higher than that of any naturally occurring oils.

The polymers prepared by the methods disclosed above are of very high molecular weight and as the melecular weight increases, the amount necessary for a specific thickening of a given lubricating oil decreases markedly so that from this point of view the highest molecular weight obtainable would be the most desirable. However, it has been discovered that as the molecular weight increases, the polymer tends to become less stable and decomposes in use or, at least, appears to do so since it loses its thickening power to a certain degree. Furthermore, analysis, for example fractional precipitation from a benzene solution by the addition of alcohol or acetone, shows that the polymers are not homogeneous but contain a broad band of substances of various molecular weights and the heavier members tend to be decomposed or depolymerized more quickly than the lighter ones. It has been found that the stability against further breakdown is greatly increased by a process of homogenization, by which is meant any process by which the heavier members are selectively destroyed so as to produce a narrower range of molecular weight than is found in the natural polymer or the synthetic product prepared by the chemical means described above. Various methods of homogenization have been found, one consists in raising the temperature and permitting the polymer to break down or substantially depolymerize; this is a heat treating method. The mechanical methods consist in mastication of the crude polymer by kneaders, between gears or rolls and the like or of the solution of the polymer in oils. These will be described more fully below.

Since it is difficult to actually measure molecular weights and since the same molecular weight ranges do not correspond in all thickening polymers, it has been found desirable to classify them on a different basis. It has been found desirable to classify all of these polymers on the basis of their specific thickening effect in a certain definite solvent and this method gives an index number which is accurately and easily determined and which does not depend upon the particular homologous series to which the polymer belongs. Tetralin has been chosen as the solvent and the index number has been taken as the viscosity relative to water at 20° C. of a solution containing 2.8% by weight of the particular polymer.

From what has been said it will be understood that every polymer, whether a natural one modified as indicated above or artificially prepared, is a mixture of a large number of substances presumably of the same homologous series but of different index numbers, the average index number being determined by the thickening test. It has been found that the higher index numbers, that is to say higher molecular weight polymer fractions, lose their thickening power more readily during use than the lower. The average index numbers may be readily adjusted in the process of manufacture within rather broad limits, but there are always fractions of the product of considerably higher number than the desired average. The homogenizing process reduces the range of index number of the various fractions although the product is still a mixture of different molecular weight substances. It is especially desirable to remove the heavier fractions which have a great thickening power but which are rapidly destroyed. Homogenization is not intended to mean reduction to such a point that only material of a single molecular weight is obtained.

In addition to the above it has been noted that the maximum allowable index number to insure stability of the polymer during use depends upon the particular service to which the oil is applied. It has been found that lubricants for automotive engines require polymers of say 5.5 to 7.5 average index number and if a higher number be used loss of viscosity is noted during the use, but polymers of lower number may be used without difficulty except that a considerably greater quantity of say a 2 or 3 would be required to produce the same effect as a smaller amount of a 6 or a 7 polymer. For gear or transmission oils the maximum average number is about 3 to 3.2 and it is preferred to use 2.5 to 2.8, which allows a good factor of safety against loss. From the above examples it will be relatively easy to pick out the proper polymer for any particular service, keeping in mind the temperature at which the oil is to be used and the bearing pressure encountered. The above figures have been based on average index numbers of moderately homogenized fractions but if the range of numbers in the various fractions of the polymer is wide, for example in an unhomogenized polymer, it is better to use a somewhat lower number due to the breakdown of the heavier fractions, which will occur during use. If the polymer is thoroughly homogenized, products with numbers of .5 to 1 point higher than given above may be used. The figures given above are given merely to illustrate the grades and amounts ordinarily found most useful. The important point to note is that homogenization raises the tetralin number which can be used in any particular service but the average number chosen must be chosen with an eye to the severity of service to be encountered.

The amount of the different polymers can be best determined by actual test and from the specific examples which will be indicated below, but in general the amounts of a 6 to a 7.5 polymer added to light oils in order to increase their viscosity within the range suitable for automotive lubricants is of the order of 2 to 10% while the amounts of a 2.5 to 3 polymer added to oils to produce transmission lubricants is from 10 to 25%, and rarely over 35%. Naturally, less polymer is required to increase the viscosity of a relatively more viscous oil to a certain grade than a less viscous oil.

As indicated above, the polymers of this class bring about a considerable increase of viscosity index in addition to the increase of viscosity at any given temperature. It is often desirable to produce a high viscosity index oil and for this purpose it is necessary to pick out base oils of definite upper viscosity limits in order not to have too thick an oil for the particular purpose. To illustrate, the following table is given. In each case the finished product has viscosity of from 250 to 300 Saybolt seconds at 210° F. and a viscosity index of 120.

| Viscosity index of the base oil | Approximate allowable upper limit of viscosity @ 210° F. to produce a 120 V. I. product of 250 to 300 sec. at 210° F. |
|---|---|
| 0 | 43 |
| 25 | 46 |
| 50 | 50 |
| 75 | 56 |
| 90 | 64 |
| 100 | 85 |

The above table is merely illustrative and if oils of say 110 or 115 or 130 v. i. are to be made it will be understood that there is a similar upper viscosity limit.

Referring now to the drawing, Fig. 1 illustrates a method by which polymers, either natural or synthetically produced, may be homogenized by heat treatment. Reference numeral 1 designates a feed line through which a light oil such as benzol or naphtha or gas oil is forced by a pump 2 into a mixing device 3 into which the natural or synthetic polymer is also added. Solution is accomplished therein and the concentration may be varied as desired, it being preferable to keep it below 10 or even 5% in order to cut pumping losses. The mixture is then forced through a heating coil 4 arranged in a setting 5. Sufficient time may be allowed during the heating for decomposition but it may be sufficiently short so as to accomplish merely a heating without decomposition. The temperature reached is preferably above 500° F. say from 500 to 800° F., and a chamber 6 is provided for increasing the reaction time. This reaction is somewhat similar to cracking but it is apparently not exactly the same and is better described as limited depolymerization. The temperature may be below the usual cracking range if desired. The degrading of the polymer number is, of course, proportional to the degree of decomposition, and this can be regulated by a suitable adjustment of temperature and time. The time may be increased by recirculation of the oil polymer mixture through line 7 and pump 8, and when the decomposition is sufficient the oil mixture is then passed into a cooler 10 through the valve 9 and into a tank 11.

If desired the lubricating oil to which the polymer is to be eventually added may be introduced into tank 11 by line 12 and the pump 13, but it need not be added at this point and if preferred it may be added later. In any case the polymer solution is forced into the still 14 which may be used to evaporate off the lighter solvent, that is the benzol, gas oil or naphtha, as the case may be. The lubricating oil, as indicated above, may be added to the still after the light oil has been removed, using line 15, and the light vapors are conducted to a condenser 16 and collection tank 17, from which the light solvent may be recirculated through pipe 18 for reuse.

The lubricating oil solution of the polymer is run out of the still by pipe 19 to storage. It is then subjected to treatment adapted to clear up the product which is darkened by the heat treatment. This treatment may merely comprise the use of acid or clay as is now practiced in the petroleum industry.

It will be understood that the above equipment may be operated continuously, if desired, and by regulation of temperature and time the decomposition may be controlled with great accuracy. The time of treatment depends on the temperature varying inversely therewith. It may be as short as say 15 to 20 minutes at high temperature or where the average index number is to be dropped 1.0 to 1.5 on the Tetralin scale, say from 8 to 7.5, or it may be an hour or more at lower temperatures in the neighborhood of 500° F., or where relatively a large drop of say 2 to 4 points on a Tetralin scale is desired. Elevated pressure may be used to prevent evaporation and removal of the light oil, and if desired hydrogen may be introduced along with the mixture so as to accomplish a hydrogenation of the decomposed polymer. In this case relatively high pressures of say above 20 to 50 atmospheres should be used and catalysts may be present such as nickel or cobalt, but preferably metals, oxides or sulphides of the metals of the fourth and sixth group of the periodic system. The type of equipment illustrated above is believed to be most satisfactory but for small scale operations batch autoclaves may be used for accomplishing the heat decomposition.

As an example of mechanical breakdown, reference is made to Fig. 2. The numeral 20 denotes a feed line for introducing the low boiling solvent which passes to the mixer 21 as in the case above in which solution of the polymer is brought about. The concentration may be the same as indicated previously but it is desirable to have the solution dilute, not only to reduce the cost of pumping but also there appears to be a superior homogenizing action when the solution is dilute. It may, for example, be below 5%. If desired the solvent may be omitted altogether and the lubricating oil itself may be introduced by line 20a. In this case it would be passed to the mixer 21. A high pressure pump 22 picks up the solution and forces it through a heater 23. This heater may be used merely to thin the oil, for example to reach a temperature of 200 to 300° F. where there is no heat decomposition, but, if desired, higher temperatures can be used, say above 500° F., so as to obtain the combined effect of heat and mechanical decomposition.

The solution then passes into a pressure chamber 24 which is fitted with an orifice plate 25 through which the solution passes with a large drop in pressure. It will be understood that a capillary tube may be substituted for the orifice or several orifices may be arranged in series. Pressure gauges are shown above and below the orifice to indicate the drop which may be of the order of 500# per square inch but is preferably more, for example 1500 to 3000#. The lower the average molecular weight in general the higher pressures should be used to accomplish the breakdown. Recirculation line 26 and pump 27 are used to force the oil through the orifice as many times as may be required to obtain the desired decomposition. The recirculated oil may, of course, be returned through the heater if desired.

The lubricating oil with which the polymer is to be blended may be added at this point by means of a line 28 which connects with line 20a, or the oil may be added after the removal of the light solvent. In any case the polymer is pumped by line 29 into the still 30. The light oil, if used, is removed as a vapor, condensed in the cooler 31 and collected in tank 32. It may be recirculated by line 33 to pipe 20 for reuse if desired. The polymer solution in the lubricating oil can then be withdrawn by pipe 34 to storage. The mechanical type of decomposition presents certain advantages over the heat decomposition in that the polymer is not darkened in color and does not need any further refinement, but, if the polymer has been added to an unrefined lubricating oil, there is no objection to its presence during the future treatment of the oil.

The following examples are given to illustrate the nature of the polymers and the blended oils contained therein:

I. A polymer produced by the action of boron fluoride and isobutylene at −20° C. is taken up in benzol sufficient to make a clear solution at 20° C. To this solution is added in various increments small amounts of acetone which causes a precipitation. After each precipitation the liquid is removed and the solvent is evaporated from the solid. The polymer number of each fraction is then determined by obtaining the viscosity relative to water at 20° C. of a solution containing 2.8% by weight of each polymer fraction in Tetralin. The fractions are as follows:

| Fraction | Percent acetone | Percent polymer | Index No. |
| --- | --- | --- | --- |
| 1 | 2.75 | 35.4 | 10.9 |
| 2 | 4.00 | 25.0 | 9.6 |
| 3 | 6.00 | 13.8 | 6.6 |
| 4 | 10.00 | 10.6 | 5.3 |
| 5 | Large amount | 15.2 | 3.6 |

The average index number of the original polymer was approximately 8.5. This illustrates the fact that these polymers are far from homogenous.

II. An isobutylene polymer having an original index number of 11.1 is taken up in benzol (25% solution) and pumped at a high pressure so as to obtain a pressure drop of say, 1500# per square inch through an orifice of .013" diameter. The mixture is recirculated so as to make 60 passes through the orifice and samples are taken at intervals. After 10 passes the average index number has fallen to 8.8, after 20 to 8.6 and after 40 to 8.0, at which it remains constant. The original polymer and the polymer after the 60 passes are then analyzed in substantially the same manner as described in Example I. The original polymer contained the following fractions:

| Volume of fraction | Index number |
|---|---|
| *Percent* | |
| 10 | 23.0 |
| 20 | 13.6 |
| 14 | 10.0 |
| 28 | 8.3 |
| 12 | 6.0 |
| 16 | 4.0 |

The analysis of the homogenized polymer is as follows:

| Volume of fraction | Index number |
|---|---|
| *Percent* | |
| 22 | 10.0 |
| 24 | 7.6 |
| 24 | 6.6 |
| 30 | 4.0 |

While further extraction would undoubtedly have separated the various fractions into further cuts, it is clear from the above that there has been a preferential decomposition exerted upon the heaviest numbers of the polymer and that the range and frequency of polymer numbers has been greatly decreased by the mechanical action.

III. To illustrate the effect of homogenization on an oil a solution was made up to contain 5.1% of a No. 6 polymer. This had a viscosity of 160 seconds Saybolt at 210° F., after 50 hours use in a Mack truck transmission the viscosity dropped to 137 seconds and the curve was not yet flat. For the sake of comparison the same polymer was heat treated so that using 5.1% in the same base oil the solution had a viscosity of 126; after 150 hours it dropped to 119.5 but showed substantially no further decrease. In other words the homogenized polymer lost only 6.5 secs. at 210° F. where the unhomogenized lost 23 secs. at 210° F.

In other examples where the decomposition is somewhat more complete there is practically no decrease on use. The particular service in the truck transmission was more severe than would be ordinarily applied to a No. 6 or a No. 5 polymer which was used in order to illustrate the decomposition.

IV. An oil having a viscosity of 83 seconds at 210° F. and a viscosity index of 100 is used in proportion of 79% with a polymer comprising cracked hydrogenated rubber in proportion of 25%. The index number of the polymer was 3.0. The oil showed the following inspection:

Gravity _____degrees__ 27.4
Viscosity @ 100° F_____seconds__ 3730
Viscosity @ 210° F_____do____ 320
Viscosity index_____ 123

The above oil was an excellent transmission lubricant showing little or no decomposition on extended use.

V. To further illustrate the effect of homogenization the following comparative tests are shown. The base oil used in all cases was the same.

To one sample (No. 1) is added an unhomogenized isobutylene polymer of 11.1 No. and the blended oil had a Saybolt viscosity of 438 sec. @ 100° F. After running for a four hour period in a Chevrolet engine under conditions equivalent to 35 to 45 miles per hour, the oil showed a viscosity of 422 indicating a loss of 16 sec. @ 100° F.

A second sample of the same polymer was taken up in benzol (sample No. 2) and circulated through a small orifice until the polymer number fell to 7.9. The solvent was removed and the polymer added to an oil which was circulated through the orifice until the polymer number fell to 6. The viscosity of this oil was now 428 sec. @ 100° F. and after the test in the Chevrolet engine it was found to be 424, a loss of only 4 secs.

A third sample (No. 3) of the polymer was dissolved in a heavy oil and run for 50 hours in a Mack transmission. It was then diluted with more of the base stock until it recorded a viscosity of 447 sec. @ 100° F. The number of the polymer was now 5.8. This sample was run as before in the Chevrolet engine and after test the viscosity was 442 sec., a loss of 5 sec.

All of the above tests were run on the original 11.1 polymer or its homogenized products as indicated. For comparison a polymer was made with an original number of 6.4 and blended with the base to 419 sec. @ 100° F. There was no homogenization and the oil was subjected to the Chevrolet test. The viscosity fell to 410 sec. @ 100° F., a loss of 9 sec.

The above tests show that the original 11.1 unhomogenized showed more loss than an unhomogenized 6.4 but the two homogenized (2 and 3) samples showed less loss than either of the unhomogenized.

VI. In the following tests original polymers of 14.4 and 11 were broken to 8.0 and 7.9, the first by repeated passage through a narrow orifice and the latter by running in a Mack transmission. These treated samples were then subjected to a severe 4-hour run in a Chevrolet engine. The results are tabulated:

| Original polymer | 14.4 broken to 8 | 11 broken to 7.9 |
|---|---|---|
| Before 4 hr. Chevrolet test: | | |
| Vis. @ 210° F | 66.4 | 66.0 |
| Vis. @ 100° F | 436 | 447 |
| V. I. | 121 | 118 |
| After 4 hr. Chevrolet test: | | |
| Vis. @ 210° F | 65.4 | 65.8 |
| Vis. @ 100° F | 430 | 442 |
| V. I. | 119 | 118 |
| Flash °F | 430 | 445 |

These homogenized polymers are found to be as stable as unhomogenized polymers of 5.9. Thus by homogenization it is possible to use a polymer averaging 2 points higher than the unhomogenized without greater instability.

VII. In the following test a single blending oil was used for all fractions. It had the following specifications:

Viscosity @ 100° F_____ seconds__ 715
Viscosity @ 210° F_____do____ 74
Viscosity index_____ 95

Sample 1 is made up by adding to this oil 2.1% of a No. 15 polymer obtained by the polymerization of isobutylene with boron fluoride.

Sample 2 is made up by adding 22% of a No. 3 polymer which is prepared by the direct polymerization of isobutylene from a solution containing 20% thereof at a temperature of −10° F. with boron fluoride.

Sample 3 is made up by the addition to the base oil of 26% of a No. 2.6 polymer obtained by decomposition of a No. 7.5 isobutylene polymer. The following table gives the physical characteristics of the original blends and the same characteristics after severe test in a truck transmission:

|  | Sample 1 | Sample 2 | Sample 3 |
|---|---|---|---|
| Polymer No | 15 | 3.0 | 2.6 |
| Vis. @ 100° F | 2919 | 3080 | 3020 |
| Vis. @ 210° F | 251 | 260 | 250 |
| Vis. index | 123 | 120 | 120 |

After running 50 hours under severe service in a Mack truck transmission:

|  |  |  |  |
|---|---|---|---|
| Vis. @ 100° F | 1060 | 2980 | 2880 |
| Vis. @ 210° F | 108 | 247 | 245 |
| Vis. index | 116 | 120 | 120 |
| Loss in sec. Saybolt @ 210° F | 143 | 13 | 5 |

From the above tests it will be seen that all three blends were of approximately the same viscosity but were obtained by blending different amounts of polymers of different index numbers. Sample 1, which used an extremely heavy polymer, showed the greatest loss in viscosity. Sample 2, made up with an unhomogenized polymer, showed considerable depolymerization, whereas the third sample, prepared from a homogenized polymer, showed very little loss of viscosity.

The present invention is not to be limited by any theory of the nature of the polymers or of the homogenizing process, nor to any particular polymer, but only to the following claims in which it is desired to claim all novelty inherent in the invention.

We claim:

1. An improved process for increasing the stability of hydrocarbon polymers which comprises partially decomposing a mixture of linear substantially saturated hydrocarbon polymers which are oil soluble and contain unstable constituents of relatively high molecular weight, whereby the unstable constituents are broken down to products of lower molecular weight.

2. Process according to claim 3 in which the breakdown is accomplished by heat treatment at a temperature between about 500 and 800° F. for a time adapted to bring about a limited decrease in the Tetralin index number.

3. An improved process for increasing the stability of oil soluble linear hydrocarbon polymers of semi-solid to solid consistency and of the thickening and viscosity increasing type, which comprises partially decomposing said polymers by heat treatment whereby relatively unstable constituents are decomposed to lower molecular weight products.

4. An improved process for increasing the stability of oil soluble linear hydrocarbon polymers of semi-solid to solid consistency and of the thickening and viscosity increasing type, which comprises partially decomposing the polymer by mechanical working whereby relatively unstable constituents are broken down to products of lower molecular weight.

5. Process according to claim 4 in which the breakdown is accomplished by the joint action of heat and mechanical working.

6. Process for homogenizing polymers of isobutylene comprising subjecting the polymer to a treatment selected from the group consisting of heat decomposition and mechanical working.

7. Process for homogenizing polymers of hydrogenated rubber comprising dissolving the polymer in a hydrocarbon solvent and subjecting the same to a treatment selected from the group containing heat decomposition and mechanical working.

8. An improved lubricant comprising a base stock of less viscosity than eventually desired, thickened with a substantially saturated hydrocarbon polymer of the non-asphaltic chain type which has been homogenized by treatment involving partial decomposition of the heavier constituents of the polymer and dissolved therein.

9. A composition of matter comprising a mineral oil thickened by the addition of a mixture of linear substantially saturated polymers of isobutylene which polymers have been partially decomposed whereby relatively unstable constituents thereof have been broken down to products of lower molecular weight.

10. Composition of matter comprising a hydrocarbon oil thickened by the addition of a mixture of oil soluble linear substantially saturated hydrocarbon polymers of viscous to solid consistency and differing molecular weights, said polymer mixture having been homogenized by a process selected from the group consisting of heat decomposition and mechanical working.

11. Composition according to claim 10 in which the polymer is a modified natural polymer of the rubber type.

12. Composition according to claim 10 in which the polymer is a hydrogenated natural polymer of the rubber type.

13. Composition according to claim 10 in which the polymer is a hydro rubber.

14. Composition of matter comprising hydrocarbon oil thickened by a mixture of oil soluble substantially saturated linear hydrocarbon polymers of viscous to solid consistency and differing molecular weights, said polymer mixture selected from the class consisting of hydrogenated and alkylated styrol and indene polymers and having been homogenized by a treatment selected from the class consisting of heat decomposition and mechanical working.

15. Composition of matter comprising a hydrocarbon oil thickened by the addition of a mixture of oil soluble substantially saturated linear hydrocarbon polymers of viscous to solid consistency and differing molecular weights, said polymers comprising condensation products obtained by the reaction of dihalo aliphatic hydrocarbons of less than 5 carbon atoms with monocyclic aromatic hydrocarbons, the polymers having been homogenized by a treatment selected from the group consisting of heat decomposition and mechanical working.

16. Composition according to claim 15 in which the polymer is obtained by condensation of dichlor ethylene with benzol.

17. Composition according to claim 8 in which the polymer is homogenized by vigorous mechanical working under pressure.

18. Composition according to claim 8 in which the polymer is homogenized by a combination of mechanical working under pressure and heat decomposition.

19. In the process of producing polymers of the type obtained by polymerizing unsaturated hydrocarbons capable of forming polymeric homologous series by means of a polymerization catalyst of the type of boron fluoride, which are substantially mechanically stable in solution of mineral lubricating oils under lubricating conditions, from polymers of the same type having molecular weights substantially in excess of 10,000 and which break down under lubricating conditions, the steps comprising subjecting the unstable polymers to a milling operation of the type performed in a colloid mill and of sufficient intensity to effect a mechanical break down of unstable polymers to products of lower molecular weights, and continuing this treatment for at least a time sufficient to render the product stable to the shear viscosity breaking test herein described.

20. The process of claim 19 in which the polymers are dissolved in a hydrocarbon solvent prior to subjecting them to the milling operation.

21. The process of claim 19 in which the polymers are dissolved in a mineral lubricating oil prior to subjecting them to the milling operation.

PER K. FROLICH.
FLOYD L. MILLER.